US006466921B1

(12) United States Patent
Cordery et al.

(10) Patent No.: US 6,466,921 B1
(45) Date of Patent: Oct. 15, 2002

(54) VIRTUAL POSTAGE METER WITH SECURE DIGITAL SIGNATURE DEVICE

(75) Inventors: Robert A. Cordery, Danbury, CT (US); Gary M. Heiden, Shelton, CT (US); David K. Lee, Monroe, CT (US); Frank M. D'Ippolito, Arlington, MA (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/242,207

(22) PCT Filed: Jun. 12, 1998

(86) PCT No.: PCT/US98/12276
§ 371 (c)(1),
(2), (4) Date: Jun. 11, 1999

(87) PCT Pub. No.: WO98/57304

PCT Pub. Date: Dec. 17, 1998

Related U.S. Application Data

(60) Provisional application No. 60/049,518, filed on Jun. 13, 1997.

(51) Int. Cl.[7] .............................................. G07B 17/00
(52) U.S. Cl. ......................... 705/60; 705/401; 705/404
(58) Field of Search ........................... 705/60, 62, 401, 705/404, 410

(56) References Cited

U.S. PATENT DOCUMENTS

| 4,180,856 A | | 12/1979 | Check, Jr. et al. ........... 364/466 |
| 4,376,299 A | * | 3/1983 | Rivest .......................... 705/61 |
| 4,376,981 A | | 3/1983 | Check, Jr. et al. ........... 364/466 |
| 4,423,287 A | | 12/1983 | Zeidler ...................... 178/22.08 |
| 4,556,944 A | | 12/1985 | Daniels et al. .............. 364/466 |
| 4,567,359 A | * | 1/1986 | Lockwood .................. 235/381 |
| 4,578,530 A | | 3/1986 | Zeidler ...................... 178/22.08 |
| 4,725,718 A | * | 2/1988 | Sansone ....................... 235/495 |

(List continued on next page.)

FOREIGN PATENT DOCUMENTS

| EP | 0833285 | 1/1998 |
| JP | 06-284124 A | 10/1994 |
| WO | WO 98/57460 | * 12/1998 |

OTHER PUBLICATIONS

"Aladdin and Ubizen Announce Strategic Partnership; eToken Technology Integrated With Ubizen's MultiSecure Solutions"; PR Newswire, Apr. 11, 2001.*

(List continued on next page.)

*Primary Examiner*—Edward R. Cosimano
(74) *Attorney, Agent, or Firm*—Brian A. Lemm; Angelo N. Chaclas; Charles R. Malandra, Jr.

(57) ABSTRACT

A system and method of evidencing postage payment includes a data center with a database storing a plurality of meter records. Each meter record includes meter information corresponding to a metering account. When a request for postage is received, a secure co-processor device in the data center obtains the appropriate meter record and verifies the authenticity of the meter record by verifying a signature in the meter record and comparing freshness data in the meter record to freshness data in the secure device. If verified, the secure device then accounts for an amount of postage to be evidenced, generates evidence of postage payment and updates the meter information, including the freshness data, in the meter record. The secure device then signs the updated meter information, stores the signature in the meter record, and returns the updated meter record to the database.

13 Claims, 4 Drawing Sheets

U.S. PATENT DOCUMENTS

| | | | | |
|---|---|---|---|---|
| 4,757,537 A | * | 7/1988 | Edelmann et al. | 380/51 |
| 4,775,246 A | * | 10/1988 | Edelmann et al. | 705/62 |
| 4,802,218 A | * | 1/1989 | Wright et al. | 705/60 |
| 4,812,994 A | | 3/1989 | Taylor et al. | 364/464.02 |
| 4,831,555 A | * | 5/1989 | Sansone | 358/1.14 |
| 4,873,645 A | * | 10/1989 | Hunter et al. | 700/231 |
| 4,873,646 A | | 10/1989 | Stoops | 364/487 |
| 4,936,209 A | | 6/1990 | Diel | 101/93.01 |
| 5,128,988 A | | 7/1992 | Cowell et al. | 379/107 |
| 5,146,403 A | | 9/1992 | Goodman | 364/401 |
| 5,163,098 A | | 11/1992 | Dahbura | 380/24 |
| 5,191,533 A | | 3/1993 | Haug | 364/464.03 |
| 5,239,168 A | | 8/1993 | Durst, Jr. et al. | 235/432 |
| 5,257,196 A | | 10/1993 | Sansone | 364/464.02 |
| 5,319,562 A | | 6/1994 | Whitehouse | 364/464.03 |
| 5,410,598 A | | 4/1995 | Shear | 380/4 |
| 5,454,038 A | * | 9/1995 | Cordery et al. | 705/60 |
| 5,491,796 A | | 2/1996 | Wanderer et al. | 395/200.09 |
| 5,510,992 A | | 4/1996 | Kara | 364/464.02 |
| 5,526,428 A | | 6/1996 | Arnold | 380/25 |
| 5,590,198 A | | 12/1996 | Lee et al. | 380/21 |
| 5,625,694 A | | 4/1997 | Lee et al. | 380/23 |
| 5,680,463 A | | 10/1997 | Windel et al. | 380/51 |
| 5,699,258 A | | 12/1997 | Thiel | 364/464.19 |
| 5,781,438 A | * | 7/1998 | Lee et al. | 705/404 |
| 5,812,401 A | | 9/1998 | Moore | 705/410 |
| 5,812,666 A | * | 9/1998 | Baker et al. | 380/21 |
| 5,812,991 A | | 9/1998 | Kara | 235/375 |
| 5,822,739 A | | 10/1998 | Kara | 235/375 |
| 5,826,247 A | | 10/1998 | Pintsov et al. | 705/404 |
| 5,943,658 A | * | 8/1999 | Gravell et al. | 705/410 |
| 6,005,945 A | * | 12/1999 | Whitehouse | 380/51 |
| 6,061,670 A | | 5/2000 | Brand | 705/404 |
| 6,085,181 A | | 7/2000 | Gravell et al. | 705/408 |
| 6,249,777 B1 | * | 6/2001 | Kara et al. | 705/404 |
| 6,295,359 B1 | | 9/2001 | Cordery et al. | 380/44 |

OTHER PUBLICATIONS

"Security—Vasco Digipass Authentication Wall (Vasco introduces Digipass Authentication Wall, which eliminates many duties associated with authentication management)"; Network Computing, Jun. 11, 2001, p. 36.*

"Information Based Indicia Program (IBIP) Host Specification", United States Postal Service, No. XP–002142880, Oct. 6, 1996.

Gash, Andy; "What was lick and stick has now become click," ABIX—Australasian Business Intelligence, Apr. 14, 1998, p. 20 (Abstract Only).

"Information Based Indicia Program (IBIP) Indicium Specification," United States Postal Service, Draft dated Jul. 23, 1997.

"Information Based Indicia Program (IBIP) Postal Security Device Specification," United States Postal Service, Draft dated Jul. 23, 1997.

"Information Based Indicia Program (IBIP) Host System Specification," United States Postal Service, Draft dated Oct. 9, 1996.

"Information Based Indicia Program (IBIP) Key Management Plan," United States Postal Service, Draft dated Apr. 25, 1997.

* cited by examiner

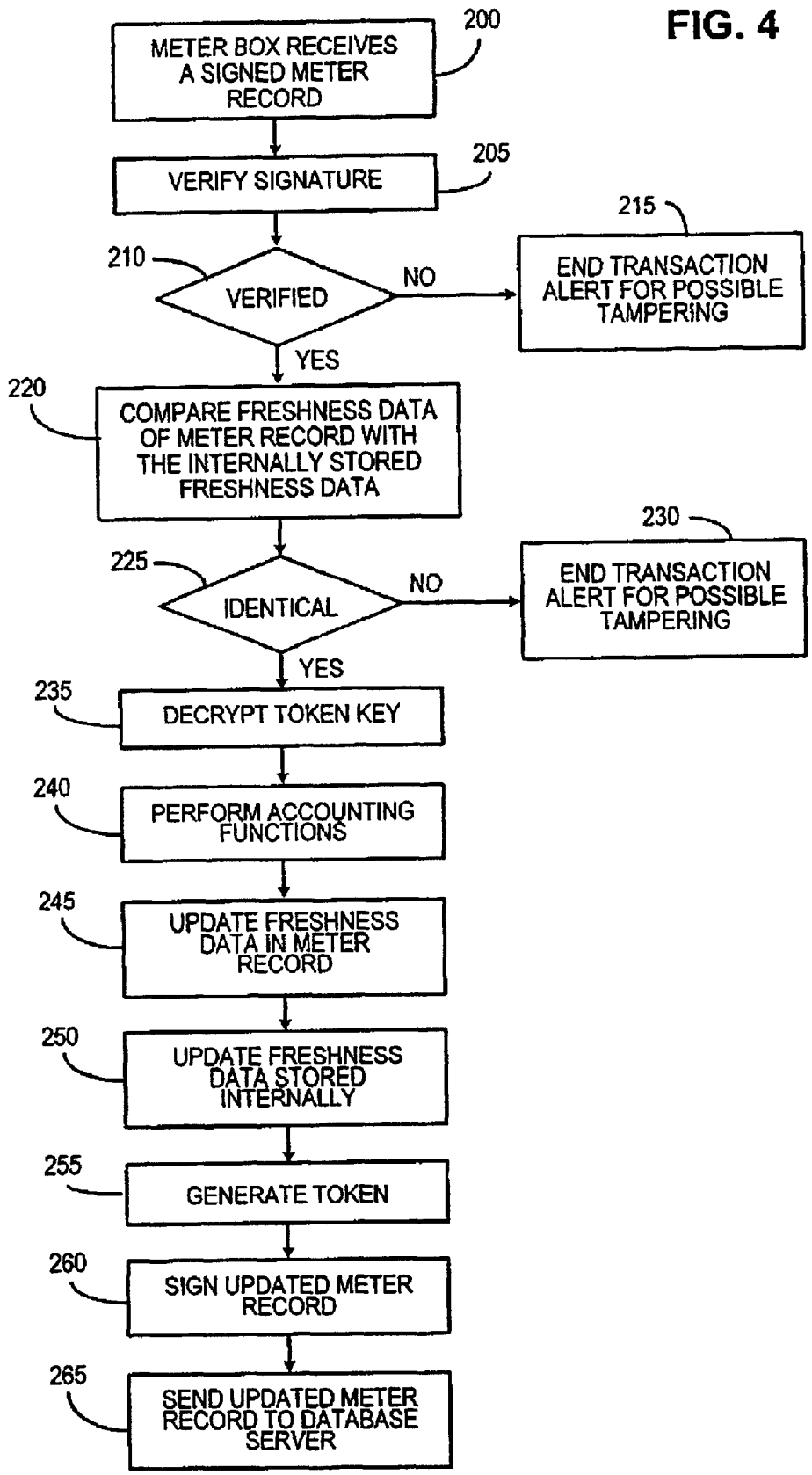

VIRTUAL POSTAGE METER WITH SECURE DIGITAL SIGNATURE DEVICE

RELATED APPLICATIONS

This is a continuation-in-part application of U.S. Provisional Patent Application Ser. No. 60/049,518, filed Jun. 13, 1997, now abandoned, and assigned to the assignee of the present invention.

The present application is related to the following U.S. patent application Ser. Nos. 09/242,210; 09/242,208; 09/242,209; 09/242,206 and 09/242,205, all being assigned to the assignee of the present invention, all of which are incorporated herein by reference in their entirety.

TECHNICAL FIELD

The present invention relates generally to a postage metering system and method for evidencing postage payment in an open system and, more particularly, to a postage metering system and method for evidencing postage payment in a virtual meter configuration.

BACKGROUND ART

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718, 4,757,537, 4,775,246 and 4,873,645, each assigned to the assignee of the present invention.

Presently, there are two postage metering device types: a closed system and an open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. In a closed system, typically the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

The United States Postal Service ("USPS") has proposed an Information-Based Indicia Program ("IBIP"), which is a distributed trusted system to retrofit and augment existing postage meters using new evidence of postage payment known as information-based indicia. The program relies on digital signature techniques to produce for each envelope an indicium whose origin can be authenticated and content cannot be modified. IBIP is expected to support new methods of applying postage in addition to the current approach, which typically relies on a postage meter to print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being created using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD"), which is a secure processor-based accounting device that dispenses and accounts for postal value stored therein to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). IBIP includes interfacing user, postal and vendor infrastructures which are the system elements of the program. The INFORMATION BASED INDICIA PROGRAM KEY MANAGEMENT PLAN SPECIFICATION, dated Apr. 25, 1997, defines the generation, distribution, use and replacement of the cryptographic keys used by the USPS product/service provider and PSDs ("IBIP KMS Specification"). The specifications are collectively referred to herein as the "IBIP Specifications".

The IBIP Specifications define a stand-alone open metering system, referred to herein as a PC Meter comprising a PSD coupled to a personal computer ("PC") which operates as a host system with a printer coupled thereto ("Host PC"). The Host PC runs the metering application software and associated libraries (collectively referred to herein as "Host Applications") and communicates with one or more attached PSDs. The PC Meter can only access PSDs coupled to the Host PC. There is no remote PSD access for the PC Meter.

The PC Meter processes transactions for dispensing postage, registration and refill on the Host PC. Processing is performed locally between the Host PC and the PSD coupled thereto. Connections to a Data Center, for example for registration and refill transactions, are made locally from the Host PC through a local or network modem/internet connection. Accounting for debits and credits to the PSD is also performed locally, logging the transactions on the Host PC. The Host PC may accommodate more than one PSD, for example supporting one PSD per serial port. Several application programs running on the Host PC, such as a word processor or an envelope designer, may access the Host Applications.

The IBIP Specifications do not address an IBIP open metering system on a network environment. However, the specifications do not prohibit such a network-based system. Generally, in a network environment a network Server controls remote printing requested by a Client PC on the network. Of course, the Client PC controls any local printing.

One version of a network metering system, referred to herein as a "virtual meter", has many Host PCs without any PSDs coupled thereto. The Host PCs run Host Applications, but all PSD functions are performed on Server(s) located at a Data Center. The PSD functions at the Data Center may be performed in a secure device attached to a computer at the Data Center, or may be performed in the Data Center computer itself. The Host PCs must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. Nos. 5,454,038 and 4,873,645, which are assigned to the assignee of the present invention.

The virtual meter does not conform to all the current requirements of the IBIP Specifications. In particular, the IBIP Specifications do not permit PSD functions to be performed at the Data Center. However, it is understood that a virtual meter configuration with each mailer's PSD located at the Data Center may provide an equivalent level of security as required by the IBIP Specifications.

In conventional closed system mechanical and electronic postage meters a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the PSD and print head. See, for example, U.S. Pat. No. 4,802,218, issued to Christopher B. Wright et al. and now assigned to the assignee of the present invention. An example of a digital printing postage meter with secure print head communication is the Personal Post Office™ manufactured by Pitney Bowes Inc. of Stamford, Connecticut.

In U.S. Pat. Nos. 4,873,645 and 5,454,038, a virtual metering system and method are disclosed wherein the postal accounting and token generation occur at a data center remote from the postage evidencing printer. Although the Data Center may be a secure facility, there remain certain inherent security issues since the accounting and token generation functions do not occur in a secure device local to the postage printer. The virtual postage metering system includes a computer coupled to an unsecured printer and to a remote data metering system. The postal accounting and the token generation occur at the Data Center.

The Data Center is a centralized facility under the control of a meter vendor, such as Pitney Bowes, or the Postal Service. As such, it is regarded as secure compared to the environment that customers handle meters directly. However, data stored at the Data Center is accessible to Data Center personnel and, therefore, at a minimum, subject to at least inadvertent modification by such personnel. Any unauthorized changes to the user and meter data stored at the Data Center compromises the integrity of the virtual metering system.

DISCLOSURE OF THE INVENTION

It has been determined that a virtual postage metering system provides benefits that are not available under conventional postage payment systems. For the Posts, a virtual postage metering system provides central management of all postage without the need to manage physical meters or PSDs. A further benefit is the opportunity to directly associate a mailer to each mailpiece as opposed to each reset. For mailers, no metering hardware, i.e. postage meter or PSD, is needed. Nor do mailers need to maintain current lists of valid addresses, such as with purchased CD-ROMs. Mailers can acquire postage on an as-needed basis. Finally, meter vendors do not have to keep track of physical meters. A virtual postage metering system eliminates stolen or relocated meter problems and simplifies meter management in general.

The present invention provides digital data security for a Data Center of a virtual postage metering system that prevents inadvertent and intentional modifications to meter and user data stored at the Data Center. In accordance with the present invention security boxes are used to protect against unauthorized alteration of meter and user records stored at the data center. The present invention also provides secure control of digital token generation process and the associated secure accounting for each postage evidencing transaction occurring at the data center.

Security issues for the virtual postage metering system include user authentication, financial and postage transactions, and meter records. For the user authentication and meter records, the database hold encryption keys in cipher text and not in plain text. For each transaction, all data, including a time stamp or sequence number, used to complete the transaction are digitally signed and the signature is stored as part of the updated transaction record. It has been found that maintaining transaction records in this manner prevents inadvertent modification of the records.

Although the digital signature provides reasonable security, it is not bulletproof. It has been found that a historically signed record could be used in place of a current record requiring a more robust verification system to detect such "tampering". In accordance with the present invention, another level of security is added. It has been found that once the signature is verified, the transaction data can be checked for freshness to eliminate any possibility of tampering, inadvertent or intentional.

In accordance with the present invention, a system and method of evidencing postage payment provides a secure box is used to sign the transaction data and to authenticate meter and user records. The system and method includes a data center with a database having a plurality of meter records stored therein. Each meter record includes meter information corresponding to a metering account assigned to each of a plurality of remote user devices that are authorized to request evidence of postage payment. When a request for postage is received at the data center, a secure co-processor device in the data center obtains the appropriate meter record and verifies the authenticity of the meter record by verifying a signature in the meter record and comparing freshness data in the meter record to freshness data in the secure device. If verified, the secure device then accounts for an amount of postage to be evidenced, generating evidence of postage payment and updates the meter information, including the freshness data, in the meter record. The secure device then signs the updated meter information and stores the signature in the meter record. The secure device then returns the updated meter record to the database.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 4 is a flow chart of the process performed within the secure meter box of the virtual postage metering system of FIG. 1.

BEST MODE FOR CARRYING OUT THE INVENTION

Figure 1:
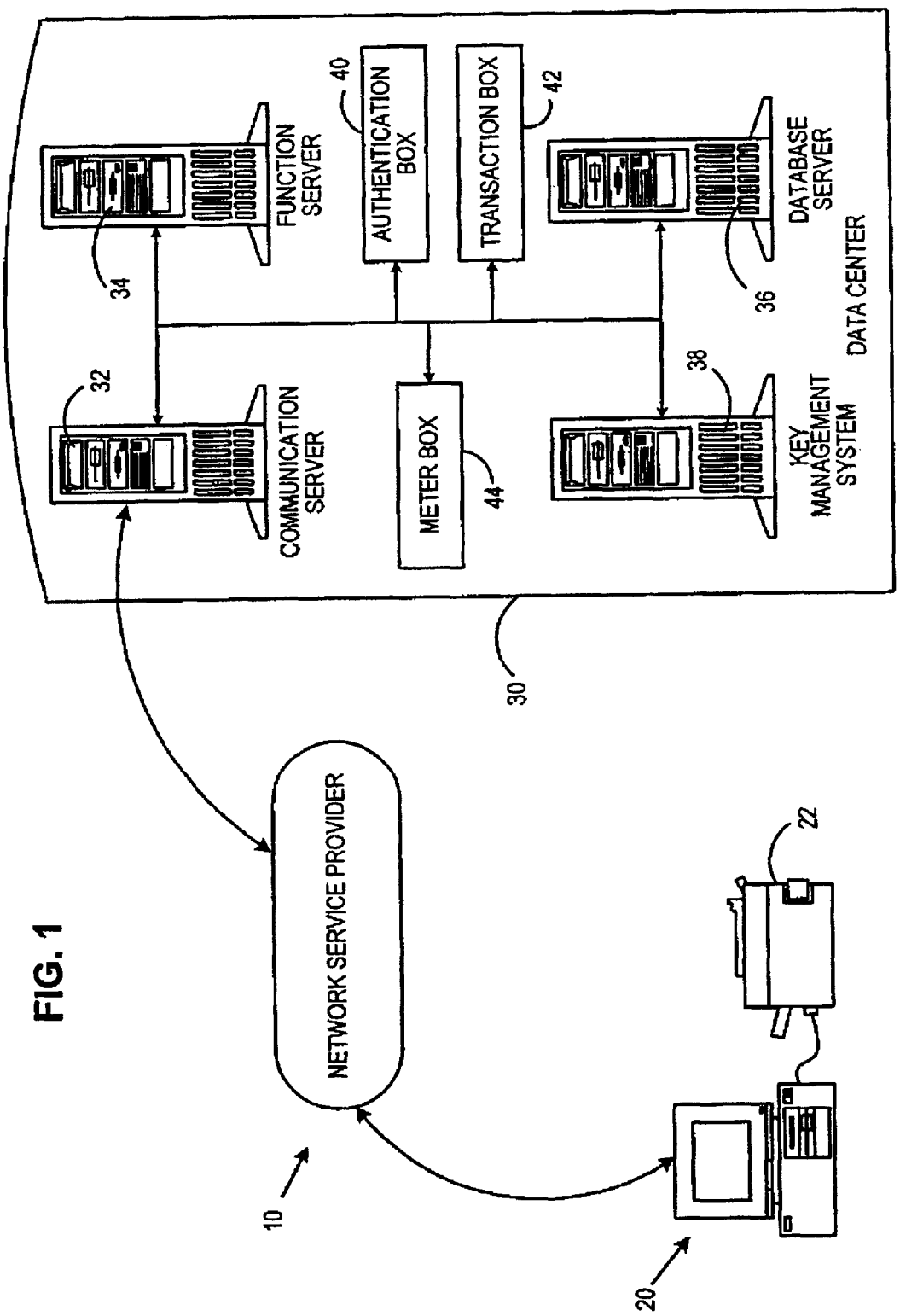
FIG. 1 is a block diagram of a virtual postage metering system for dispensing postage embodying the principles of the present invention.

In describing the present invention, reference is made to the drawings, wherein there is seen in FIG. 1, a virtual postage metering system, generally designated 10. The virtual postage metering system 10 includes a plurality (only one is shown) of personal computer (PC) systems, generally designated 20, each having access to a printer 22 for printing evidence of postage on an envelope or label. PC 20 is connected with a transaction processing Data Center 30 that performs postal accounting and evidencing of postage. The virtual postage metering system 10 allows each mailer to use a conventional PC to remotely obtain evidence of postage payment on an as needed basis. Unlike conventional postage metering systems, virtual postage metering system 10 does not include any meter hardware located at the mailer's site. Nor are any postal funds stored at the mailer's site. All metering and accounting of funds occur at Data Center 30 using functional software and database records representing each mailer's "postage meter", referred to herein as a "meter account".

The accounting method for virtual postage metering system 10 may be a conventional prepayment or post-payment system. The preferred method a prepayment method wherein each mailer is required to put a minimum amount of money into the mailer's virtual meter account. As account funds drop below a specific level a refill is charged against the mailer's account. An alternate accounting method that is suitable for a virtual postage metering system is a real-time payment method in which the amount of a transaction is charged to a mailer's credit card account when the transaction occurs. This method is referred to herein as a "trickle charge" postage payment, because the mailer does not pay for postage for a mailpiece until the mailer is ready to print the mailpiece.

In the virtual postage metering system, a "meter" vendor, such as Pitney Bowes Inc., provides the mailer with client software that runs on PC 20, e.g., the client software may be downloaded from the vendor's Internet server. Alternatively, the client software may be the Internet browser based home pages that provide user interactions with the Data Center 30. The meter vendor also manages Data Center 30. The client software initiates communications with Data Center 30 which performs metering transactions to evidence postage for single mailpieces or batches of mailpieces. In the preferred embodiment, the client software establishes a connection to the Data Center, and requests postage by providing postal information relating to the requested transactions, such as postage amount, addressee information and (optionally) the origin of deposit for each mailpiece. Data Center 30 receives the postal information, determines the origin zip for the mailpiece(s), performs accounting functions and generates an encrypted evidence of postage payment, such as a token or digital signature, and sends indicium information including the token, to PC 20. PC 20 receives the indicium information, creates an indicium bitmap, which can be displayed on a PC monitor (not shown) and printed on the mailpiece by printer 22. PC 20 then disconnects from Data Center 30 or requests another transaction. The connection between PC 20 and Data Center 30 may be through a Network Service Provider, such as on the Internet, or by direct dial using the PC's modem.

Virtual postage metering system 10 eliminates the need to maintain and account for traditional metering devices at each mailer's site and provides flexibility for handling requests from multiple origins of deposit by each mailer. Virtual postage metering system 10 also provides value added services that are not available with conventional meter devices, such as, real-time address hygiene, direct marketing services and trickle charge postage payment. Virtual postage metering system 10 provides user authentication by Data Center 30 to identify mailers with valid accounts. When a mailer has been authenticated for each request, for example, by a username, password or other conventional methods, Data Center 30 services the request, and returns indicium information to the PC 20 where the indicium is created and printed on the mailpiece.

Referring again to FIG. 1, the mailer initiates a postage evidencing transaction by running client software in PC 20, which contacts Data Center 30. At Data Center 30, a Communication Server 32 supports connectivity from various communication technologies and protocols. The Communication Server merges all incoming traffic and routes it to a Function Server 34, which includes application software that supports mailer sign-on, postage dispensing and postal reporting. All mailer and meter information is accessed from a Database Server 36 where the information is securely stored using secure cryptographic processes and protocols as described below. Data Center 30 maintains cryptographic keys for each meter account in Database Server 36. The cryptographic keys are used for postage evidencing and verification as well as for security of the records stored in Database Server 36. A Key Management System 38 administers all cryptographic keys used in virtual postage metering system 10. The cryptographic keys may be distributed to verifiers in remote locations. U.S. Pat. No. 5,812,666, assigned to the assignee of the present invention, describes such a key management system.

A mailer may establish a meter account through an on-line sign-up process with Data Center 30. During sign-up, the mailer enters, at PC 20, account information, such as user name, password and method of payment. Any registration fees can be charged at this time. Data Center 30, preferably administered by a meter vendor, such as Pitney Bowes Inc., arranges all meter licenses and agreements between its mailers and the Post.

In the present invention, the PSD does not exist, i.e., there is no metering device coupled to the PC from which postage payment is requested. Virtual postage metering system 10 replaces the accounting and metering functions of the PSD with metering software at PC 20 and mailer account information performed and updated at Data Center 30. The virtual postage metering system 10 provides each mailer with a metering system that has the capability of originating transactions from multiple origins of deposit. See, for example, previously noted U.S. patent application Ser. No. 09/242,206.

Various methods can be used to determine the origin of deposit for a requested transaction. For example, a method for determining origin zip code using a caller ID from a telephone call is disclosed in U.S. Pat. No. 5,943,658, assigned to the assignee of the present invention, which is hereby incorporated in its entirety by reference.

In accordance with the present invention, one or more cryptographic modules, referred to herein as secure "boxes", are located within Data Center 30 and are used to perform cryptographic processes. Each secure box is a secure, tamper-evident and tamper-responding device, including a processor and memory, that stores encryption keys and performs cryptographic operations using the keys within the secure boundary of the device. Data Center 30 includes several types of secure boxes, which are described below. In the preferred embodiment, Data Center 30 includes multiple boxes of each type for redundancy and performance.

Key Management System 38 includes a manufacturing box (not shown) that provides top-level keys used to generate random numbers for seeding each of the other secure boxes. By sharing a common cryptographic key, the secure boxes communicate securely within Data Center 30. Key Management System 38 also includes a "steel" box (not shown) that shares a common key with meter box 44 (described below) to encrypt/decrypt master token keys for postage evidencing transactions for each meter account. The steel box merges a vendor key and a postal key into one record in cipher text. For each meter account, Data Center 30 creates a logical meter, i.e. a meter record, in Database Server 36 by generating a token key using the vendor and postal keys, initializing meter registers (ascending and descending), meter freshness data (described below) and other postal information as part of the meter record, and then storing the meter record in Database Server 36.

Data Center 30 also includes a meter box 44 that shares a secret key with the steel box for decrypting the token key encrypted in the meter record. Meter box 44 also holds the key used for digital signature of transaction records. The only other information stored in meter box 44 is freshness data for each meter record processed by meter box 44. For each postage transaction, meter box 44 generates at least one digital token or signs the postage transaction, and updates the meter record corresponding to the transaction. Each meter record in Database Server 36 includes postal funds as well as the token keys in cipher text. Meter box 44 uses the token keys to generate tokens, updates the postal funds in the meter record, and signs the updated meter record. In this manner, meter box 44 performs and controls the secure accounting for each transaction. Meter box 44 can also be used to verify the token or the transaction signature for verification of the postage evidencing for the transaction.

Data Center 30 also includes an authentication box 40 that shares a different secret key with the steel box to decrypt an user authentication key stored in cipher text in Database Server 36. Authentication box 40 also executes the authentication algorithms using the decrypted authentication key to authenticate a mailer. This function may be added to the steel box of key management system 38 to eliminate the need for a separate box at Data Center 30.

Finally, Data Center 30 includes an transaction box 42 that shares another secret key with the steel box to sign user transaction records other than the meter records signed by meter box 44, such as logins and login history records. Transaction box 42 later verifies the transaction record signature when the next transaction is requested.

Figure 2:
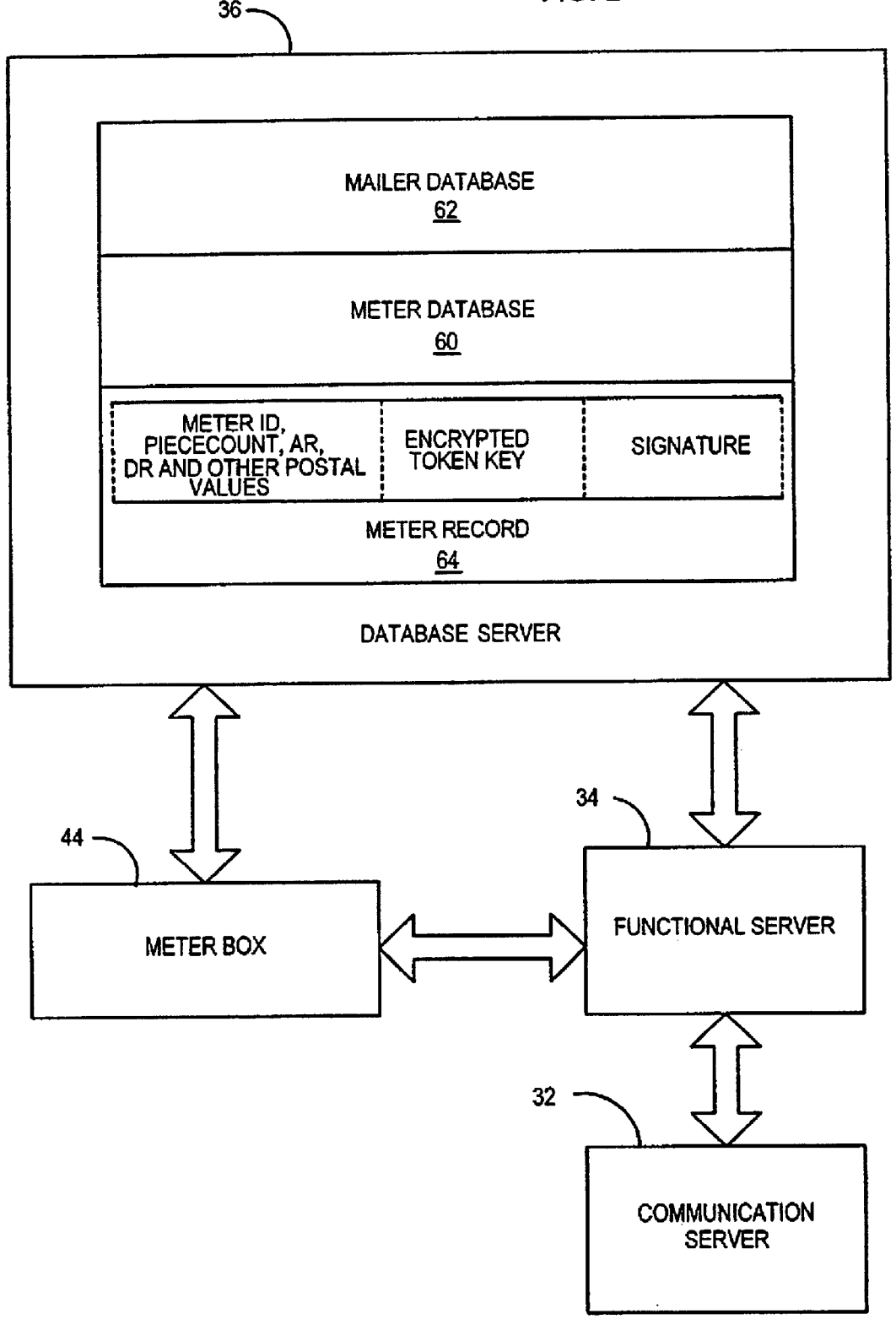
FIG. 2 is a bock diagram of the Data Center database server and secure box for the virtual postage metering system of FIG. 1.

Referring now to FIG. 2, a configuration of Database Server 36, including a meter database 60, a mailer database 62 and a database of meter records 64, is shown. Meter database 60 comprises meter information associated for each meter account, such as, meter serial number, record update counter, ascending register, descending register and other postal values. Mailer database 62 comprises mailer information and information that associates a mailer with a meter account.

In operation, Communication Server 32 receives a request for a meter transaction from mailer PC 20. The application software in the Function Server 34 controls the processing of the transaction request. Function Server 34 accesses mailer database 62 and meter database 60 to obtain records, including the appropriate meter record 64, corresponding to the meter account of the mailer initiating the request. Function Server 34 communicates mailer records from mailer database 62 to authentication box 40, which then authenticates the mailer requesting the transaction. Once the mailer has been authenticated, Function Server 34 communicates the appropriate meter record 64 to meter box 44, which verifies a signature and freshness data for the record. Meter box 44 decrypts the encrypted key(s) that are stored within meter record 64, performs accounting functions on the ascending and descending registers in meter record 64, and uses the key(s) to generate a token for the requested transaction. Meter box 44 then generates data for an indicium, and resigns meter record 64. The updated and signed record is then sent back to Database Server 36 where it is stored as part of meter database 60.

At Data Center 30, the authentication keys are not available in plain text, but must be distributed to the mailer. Conventional methods of distributing and updating the authentication key for each mailer can be used. See, for example, previously noted U.S. Pat. No. 5,812,666, which describes a key management system for distributing and updating cryptographic keys to the secure boxes and the mailer's PC.

One of the important tasks for key management system 38 is to obtain the postal key and associate it with a vendor key. In key management system 38, the steel box creates a meter serial number, manufacturing number, vendor and postal keys in one meter record 64 for each meter account.

For the encryption/decryption algorithms, a set of triple DES keys are used for encrypting the encryption keys for generating a tokens or signatures for indicia. Another set of triple DES keys are used for signing meter records. Meter box 44 securely stores both sets of triple DES keys. In order avoid using only one key to encrypt the entire set of meter keys for generating a tokens or signatures for indicia, a derived key is used. The first set of triple DES keys derives triple DES keys by encrypting the meter (account) serial number in each meter record. The derived triple DES keys then encrypt the encryption keys for the indicia which are to be stored in the Database Server 36. The second set of triple DES keys for signing uses a similar scheme to derive the signature keys in a similar manner, i.e. using the meter serial number as data to derive keys. It will be understood that one set of triple DES keys can be used for both purposes. However, it is desirable that each set of keys be used only for one purpose.

In the preferred embodiment of the present invention, one common key is used to sign all transactions and records that require a digital signature, such as, meter records, postage transactions, funds transfer records, master account records, etc. Multiple boxes of each box are used for redundancy and to share the workload as the number of transactions grow. The signing box, such as meter box 44 or authentication box 40, will also verify the signature of a record.

With regard to the signature algorithm for meter record 64, a message authentication code (MAC) is employed to provide message integrity for the sensitive virtual meter records. This MAC involves multiple applications of the Data Encryption Standard (DES). The signature keys will be updated using the current month and year. During manufacturing, two initial master keys will be entered into the non-volatile memory (NVM) of meter box 44. NVM is used both for permanent storage and for the prevention of external access to the key information. The keys for indicia and the keys for signature are derived in a conventional manner, such as described above. The virtual meter record signature verification algorithm simply recalculates the signature of the meter record 64 using the signature algorithm and data within meter record 64 and compares calculated signature to the signature in meter record 64.

Figure 3:
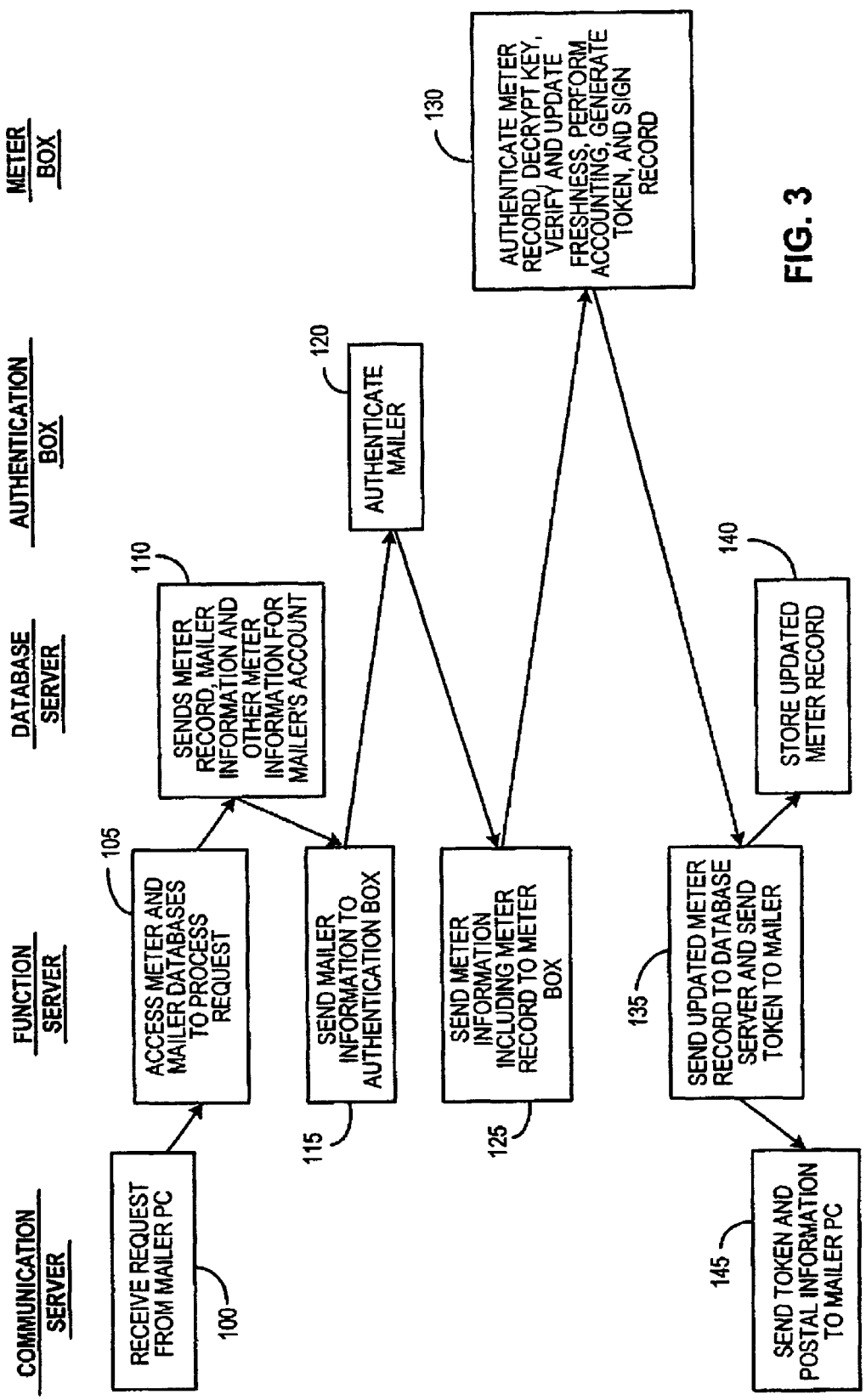
FIG. 3 is a flow chart of the process for evidencing postage by the virtual postage metering system of FIG. 1.

Referring now to FIG. 3, the process for securely performing a postage evidencing transaction in a virtual postage metering system is described. At step 100, Communication Server 32 receives a request for postage evidencing from mailer PC 20. At step 105, Function Server 34 requests access to the mailers account information stored in Database Server 36. At step 110, Database Server 36 sends mailer information, meter information, including a meter record associated with the mailer initiating the request. At step 115, Function Server 34 sends the mailer information to Authentication Box 40. When the mailer is authenticated at step 120, then, at step 125, Function Server 34 sends the meter information, including the meter record to meter box 44. At step 130, meter box 44 authenticates the meter record, decrypts the encrypted token key which is part of the record, verifies freshness of the record, performs accounting, generates a token, updates the freshness data and signs the meter record, which is returned to Function Server 34. At step 135, Function Server 34 sends the updated and signed meter record to Database Server 36 and sends to the Communication Server 32 the token and associated postal information needed to create an indicium. At step 140, Database Server 36 stores the updated and signed meter record. At step 145, Communication Server 32 sends the token and postal information to mailer PC 20.

Referring now to FIG. 4, the process performed within the secure meter box of the virtual postage metering system is described. At step 200, meter box 44 receives a signed meter record. At step 205, the signature of the meter record is verified. If not verified at step 210, then, at step 215, the meter box ends the transaction and alerts the Function Server 34 for possible tampering. If the signature has been verified, then, at step 220, the meter box compares freshness data that is stored in meter box for each meter account to freshness data stored as part of the meter record. The freshness data chosen for this comparison must be data that is unique for each transaction. In the preferred embodiment, the record update counter is used, however a random number, time stamp or other nonce may be used. The comparison at step 220 prevents inadvertent or intentional substitution of an old meter record for the current meter record during the virtual postage metering transaction.

At step 225, if the compared freshness data are not identical, then, at step 230, the meter box ends the transaction and alerts the Function Server 34 for possible tampering. If the freshness data stored in the meter record is identical to the freshness data associated with the meter record which is stored in the meter box, then, at step 235, the meter box decrypts the token key that was received in encrypted form as part of the meter record. At step 240, the meter box performs accounting functions for the transaction, such as incrementing the ascending register, decrementing the descending register and incrementing the record update counter. At step 245, the freshness data in the meter record is updated. At step 250, the freshness data stored in meter box 44 is updated. At step 255, the meter box generates the token using the decrypted token key. At step 260, the meter box updates the meter record by storing the new register values and record update counter in the meter record, and then signs the updated record using a key stored in the meter box. At step 265, the meter box sends the updated and signed meter record to Database Server 36 for storage until the next transaction for the meter account assigned to the meter record.

It will be understood that, although the embodiments of the present invention are described as postage metering systems, the present invention is applicable to any value metering system that includes transaction evidencing, such as monetary transactions, item transactions and information transactions.

While the present invention has been disclosed and described with reference to embodiments thereof, it will be apparent, as noted above, that variations and modifications, such as using public keys instead of private keys, may be made therein. It is, thus, intended in the following claims to cover each variation and modification that falls within the true spirit and scope of the present invention.

What is claimed is:

1. A secure postage dispensing system comprising:
    a data center for dispensing postage in response to requests for postage from a plurality of remote user devices, the data center comprising:
        database means for storing data records, said data records including user information and meter information for individual metering accounts, each of said meter accounts being assigned to each of said plurality of remote user devices;
        means for receiving requests for postage evidencing from the plurality of remote user devices;
        means for authenticating each request for postage evidencing using said user information and said meter information corresponding to the metering account for the remote user device initiating the request for postage evidencing; and
        means for dispensing the requested postage evidence, said dispensing means including at least one first secure device, including processor and memory, wherein said first secure device obtains said meter information from said database means, verifies the authenticity of said meter information, generates the requested postage evidence, updates said meter information, digitally signs the updated meter information and returns the signed updated meter information to said database means.

2. The system of claim 1 wherein said means for receiving comprises a communication server and said database means comprises a database server each being located at the data center.

3. The system of claim 1 wherein said database means includes a database of meter records, each of the meter records including the meter information corresponding to one of the metering accounts for the plurality of remote user devices and a signature of the meter information.

4. The system of claim 3 wherein said meter information includes ascending and descending registers, an encrypted token key and freshness data.

5. The system of claim 4 wherein the freshness data comprises a record update counter corresponding to the number of postage evidencing transactions processed by said secure device.

6. The system of claim 3 wherein said first secure device includes means for storing first and second cryptographic keys, the first key being used for verifying the signature in each meter record and for signing the updated meter information before returning each meter record to the database means, the second key being used for decrypting the encrypted token key in the meter record, said secure device using the token key for generating the requested evidence of postage.

7. The system of claim 6 wherein a function server processes each request received by said communication server and obtains the appropriate user information and meter information from said database server and sends the user information and meter information to the authenticating means and the dispensing means.

8. The system of claim 6, wherein said means for authenticating comprises a second secure box, including processor, memory and means for storing a third cryptographic key, the third key being used for verifying a signature associated with said user information of the metering account being processed.

9. The system of claim 8 further comprising a key management system server for generating and maintaining cryptographic keys used by to the authenticating means and the dispensing means.

10. A method of evidencing postage payment, the method comprising the steps of:

providing a plurality of meter records, each meter record including meter information corresponding to a metering account assigned to each of a plurality of remote user devices that are authorized to request evidence of postage payment;

storing the plurality of meter records in database at a data center;

obtaining a first meter record when a request for evidence of postage payment is received by the data center;

verifying the authenticity of the first meter record by verifying a signature in the first meter record;

accounting for an amount of postage evidenced;

generating a digital token as evidence of postage payment;

updating the meter information in the first meter record;

signing the updated meter information to update the signature of the first meter record; and returning the first meter record to the database.

11. The method of claim 10 wherein the steps of obtaining, verifying, accounting, generating, updating, signing and returning are performed in a secure device.

12. The method of claim 11 wherein the step of verifying the authenticity of the first meter record comprises the step of:

comparing freshness data in the first meter record with freshness data stored in the secure device.

13. The method of claim 11 wherein the step of updating the meter information comprises the step of:

updating the freshness data stored in the secure device and in the first meter record.

\* \* \* \* \*